(12) United States Patent
Chitren et al.

(10) Patent No.: US 7,604,239 B2
(45) Date of Patent: Oct. 20, 2009

(54) SPLIT BEARING ISOLATOR AND A METHOD FOR ASSEMBLING SEAL

(75) Inventors: Elizabeth Chitren, Fairport, NY (US); Christopher Tones, Palmyra, NY (US)

(73) Assignee: Garlock Sealing Technologies LLC, Palmyra, NY (US)

( * ) Notice: Subject to any disclaimer, the term of this patent is extended or adjusted under 35 U.S.C. 154(b) by 296 days.

(21) Appl. No.: 11/812,482

(22) Filed: Jun. 19, 2007

(65) Prior Publication Data

US 2008/0001362 A1 Jan. 3, 2008

Related U.S. Application Data

(60) Continuation-in-part of application No. 11/709,818, filed on Feb. 23, 2007, now Pat. No. 7,427,070, which is a continuation of application No. 11/297,489, filed on Dec. 9, 2005, now Pat. No. 7,201,377, which is a division of application No. 10/674,264, filed on Sep. 29, 2003, now abandoned.

(60) Provisional application No. 60/414,862, filed on Sep. 30, 2002.

(51) Int. Cl.
*F16J 15/44* (2006.01)
*F16J 15/447* (2006.01)

(52) U.S. Cl. .................. 277/301; 277/411; 277/412; 277/347

(58) Field of Classification Search .......... 277/301, 277/409, 411–412, 928, 347
See application file for complete search history.

(56) References Cited

U.S. PATENT DOCUMENTS

| | | | |
|---|---|---|---|
| 2,014,859 A | 9/1935 | Mitchell | |
| 3,192,942 A | 7/1965 | Manor et al. | |
| 3,602,559 A | 8/1971 | Hirschler | |
| 3,923,125 A | 12/1975 | Rosenthal | |
| 4,053,163 A | 10/1977 | Vegella | |
| 4,070,150 A | 1/1978 | Katz et al. | |

(Continued)

FOREIGN PATENT DOCUMENTS

DE 297 15 911 U 2/1999

(Continued)

OTHER PUBLICATIONS

European Published Application EP 1 962 001 A1 published on Aug. 27, 2008 including Search Report.

*Primary Examiner*—Vishal Patel
(74) *Attorney, Agent, or Firm*—Holland & Hart LLP

(57) ABSTRACT

An assembly for sealing a rotating shaft and a bearing housing which has a stator, a rotor, and a unitizing element. The stator has at least two portions and an annular engagement flange extending in an axial direction having a groove on a radial side thereof. The rotor has at least two portions and an annular engagement flange extending in an axial direction having a groove on the radial side thereof. The annular unitizing element has at least two portions, a stator engaging member that engages the stator groove, a rotor engaging member that engages the rotor groove, and a rear member having a side edge that engages the stator. A radially outer surface of the unitizing element has two areas of differing diameter, one corresponding to the rotor engaging member and the other corresponding to the rear member.

19 Claims, 13 Drawing Sheets

U.S. PATENT DOCUMENTS

| | | | |
|---|---|---|---|
| 4,166,606 A | 9/1979 | Kawolics et al. | |
| 4,466,620 A | 8/1984 | Orlowski | |
| 4,484,754 A | 11/1984 | Ballard | |
| 4,541,744 A | 9/1985 | Lederman | |
| 4,679,801 A | 7/1987 | Poloni | |
| 4,706,968 A | 11/1987 | Orlowski | |
| 4,743,034 A | 5/1988 | Kakabaker et al. | |
| 4,832,350 A | 5/1989 | Orlowski | |
| 4,852,890 A | 8/1989 | Borowski | |
| 4,863,177 A * | 9/1989 | Rockwood et al. | 277/416 |
| 4,890,941 A | 1/1990 | Calafell et al. | |
| 4,989,883 A | 2/1991 | Orlowski | |
| 5,024,451 A | 6/1991 | Borowski | |
| 5,069,461 A | 12/1991 | Orlowski | |
| 5,074,567 A | 12/1991 | Orlowski | |
| 5,078,410 A | 1/1992 | Warman et al. | |
| 5,137,049 A | 8/1992 | Orlowski | |
| 5,158,304 A | 10/1992 | Orlowski | |
| 5,161,804 A | 11/1992 | Orlowski et al. | |
| 5,163,692 A | 11/1992 | Schofield et al. | |
| 5,174,583 A | 12/1992 | Orlowski et al. | |
| 5,221,095 A | 6/1993 | Orlowski | |
| 5,303,935 A | 4/1994 | Saksun | |
| 5,335,921 A | 8/1994 | Orlowski | |
| 5,378,000 A | 1/1995 | Orlowski | |
| 5,470,157 A | 11/1995 | Dougherty et al. | |
| 5,480,161 A | 1/1996 | Borowski | |
| 5,498,006 A | 3/1996 | Orlowski | |
| 5,655,781 A | 8/1997 | Petrak | |
| 5,664,791 A | 9/1997 | Owen | |
| 5,683,091 A | 11/1997 | Isoe et al. | |
| 5,687,972 A | 11/1997 | Petrak | |
| 5,865,441 A | 2/1999 | Orlowski | |
| 5,887,875 A | 3/1999 | Salciccioli et al. | |
| 5,904,356 A | 5/1999 | Mundy | |
| 5,908,195 A | 6/1999 | Sharrer | |
| 5,951,020 A | 9/1999 | Orlowski | |
| 5,951,033 A | 9/1999 | Winter et al. | |
| 5,967,524 A | 10/1999 | Fedorovich | |
| 6,003,871 A | 12/1999 | Poll | |
| 6,015,153 A | 1/2000 | Sharrer | |
| 6,062,568 A | 5/2000 | Orlowski et al. | |
| 6,142,479 A * | 11/2000 | Fedorovich | 277/412 |
| 6,182,972 B1 | 2/2001 | Orlowski | |
| 6,213,476 B1 | 4/2001 | Chandler et al. | |
| 6,234,489 B1 | 5/2001 | Orlowski et al. | |
| 6,257,587 B1 | 7/2001 | Toth et al. | |
| 6,311,984 B1 | 11/2001 | Orlowski | |
| 6,367,807 B1 | 4/2002 | Rockwood | |
| 6,390,477 B1 | 5/2002 | Drago et al. | |
| 6,419,233 B2 | 7/2002 | Orlowski | |
| 6,471,211 B1 | 10/2002 | Garnett et al. | |
| 6,471,215 B1 | 10/2002 | Drago et al. | |
| 6,485,022 B1 | 11/2002 | Fedorovich | |
| 2001/0002742 A1 | 6/2001 | Orlowski | |
| 2002/0167131 A1 | 11/2002 | Orlowski et al. | |
| 2003/0235354 A1 | 12/2003 | Orlowski et al. | |
| 2004/0070150 A1 | 4/2004 | Chitren | |
| 2006/0005950 A1 | 1/2006 | Wang et al. | |

FOREIGN PATENT DOCUMENTS

| | | |
|---|---|---|
| GB | 1026714 | 4/1966 |
| WO | WO 95/32376 | 11/1995 |
| WO | WO 2006/005950 | 1/2006 |

* cited by examiner

SPLIT BEARING ISOLATOR AND A METHOD FOR ASSEMBLING SEAL

CROSS-REFERENCE TO RELATED APPLICATIONS

This application is a continuation-in-part of and claims priority to U.S. patent application Ser. No. 11/709,818, filed Feb. 23, 2007 now U.S. Pat. No. 7,427,070, which is a continuation of and claims priority to U.S. patent application Ser. No. 11/297,489, filed Dec. 9, 2005, now U.S. Pat. No. 7,201,377, which is a divisional of and claims priority to U.S. patent application Ser. No. 10/674,264, filed Sep. 29, 2003 now abandoned, which claims priority to U.S. Provisional Application Ser. No. 60/414,862, filed Sep. 30, 2002, entitled "LABYRINTH SEAL", all of which are herein incorporated by reference in their entirety.

FIELD OF THE INVENTION

The present invention relates to labyrinth sealing devices for providing a dynamic seal between a rotating shaft and a bearing housing, and a method for assembling the same. In particular, the invention relates to a dynamic seal which includes a unitizing element, a rotor, and a stator, each of which can be in at least two portions.

DESCRIPTION OF RELATED ART

Labyrinth type rotary shaft seals are well known in the art. Typically, these devices include two concentric ring structures which comprise a rotor and a stator. The rotor is sealingly engaged with a rotating shaft and the stator is sealingly engaged with a bearing housing. Many different types of seals have been used to try to seal the space between the spinning rotor and the fixed stator. These include O-rings, rubber lip seals, and labyrinth seals. Labyrinth seals are the most effective type of seal. Specifically contoured pathways or grooves are formed on the interior surfaces of the seal rings to create a labyrinth extending between the exterior of the bearing housing and the interior of the bearing housing. The labyrinth pathway serves as a hydrodynamic barrier to maintain fluid lubricants within the bearing housing and prevent contaminants from entering the bearing housing. The more elaborate the pathway, the less chance there is that contaminating materials will pass through the structure and into the bearing housing.

One method of making a more elaborate pathway is to increase the amount of surface area that must be traversed by the contaminating materials, i.e. by increasing the length of the pathway. In order to achieve an effective labyrinth seal, many have created elaborate sealing structures comprising ridges and valleys on both the rotor and stator sides which interlock to form a seal. By increasing the number of ridges and valleys, the total surface area/length of pathway is increased thereby achieving the above stated goal of blocking out contaminants. Given the relatively small spaces and tolerances involved, the number and size of these fingers is limited.

In another aspect of rotary shaft seals, contaminants which do migrate into the system need to be expelled as quickly as possible. Build up of particulate matter can damage the seal and/or cause increased wear of the rotor and stator. Furthermore, any lubricating fluid forced out of the system must likewise be recaptured and returned to the interior of the rotor. Loss of lubricating fluid will lead to damaged parts and increase the frictional heat of the system.

In a typical rotor and stator configuration, some minimum clearance must be maintained to keep the rotor and stator from contacting one another. In some applications, such as aircraft landing gear, the rotor spins at speeds in excess of about 5000 rpm. If a surface of the rotor contacts a surface of the stator at these speeds, frictional heat develops, the components wear and the overall efficiency and working life of the apparatus declines. It is, therefore, important to keep the rotor and stator separate.

Rubber or plastic sealing devices are often employed between the rotor and stator to keep them separate in the radial direction by providing a low friction contact between the two components. It would also be beneficial if the same sealing device could prevent contact in the axial direction, in the event that the rotor was forced toward the stator.

If the rotor were to move away from the stator, the reverse problem can occur. As the rotor moves axially away from the stator, the gap between the components widens, increasing the likelihood of contaminants entering the bearing housing or grease leaking to the outside. Both of these being undesirable scenarios, a seal that "unitizes" the rotor and stator effectively locking them together is desired. The seal should provide for easy assembly of the components, but withstand and prevent the rotor from disengaging the stator in the axial direction.

Prior labyrinth seals have failed to provide an effective seal that is durable and wear-resistant, unitizes the rotor and stator, and prevents contact between the rotor and stator during periods of axial movement.

Disassembling seals can cause increased downtime of equipment. The increased downtime can incur expensive costs. It is, thus, desirable to create seals that are more easily replaceable and which can be replaced in a more timely fashion.

It is to these perceived needs that the present invention is directed.

BRIEF SUMMARY OF THE INVENTION

The present invention provides a unitizing element and assembly for a labyrinth seal which provide a dynamic seal between a rotating shaft and a bearing housing. The unitizing element excludes contaminants from the bearing housing, while also preventing loss of bearing lubricants. The unitized, non-contacting configuration also prevents wear of the rotor and stator in the case of axial movement.

In a first aspect of the present invention, an annular unitizing element is provided comprising a rotor engaging member, a stator engaging member, and a rear member. The radially outer surface of the unitizing element comprises two areas of differing diameter, one corresponding to the rotor engaging member and the other corresponding to the rear member and the stator engaging member extends radially inward from the radially inner side of the annular unitizing element.

In another aspect of the present invention a sealing assembly for sealing a rotating shaft and a bearing housing is provided comprising a rotor comprising an annular engagement flange extending in an axial direction comprising a groove on a radial side thereof, a stator comprising an annular engagement flange extending in an axial direction comprising a groove on a radial side thereof, and an annular unitizing element comprising, a stator engaging member, a rotor engaging member, and a rear member. The rotor engaging member engages the rotor groove and the stator engaging member extends from the unitizing element in a radial direction to engage the stator groove.

In a further aspect of the present invention a method for assembling a sealing assembly for sealing a rotating shaft and a bearing housing is provided comprising: providing a rotor comprising an annular engagement flange extending in an axial direction comprising a groove on a radial side thereof; providing a unitizing element comprising a stator engaging member, a rotor engaging member, a void comprising the area between the stator engaging member and the rotor engaging member, and a rear member; engaging the unitizing element with the rotor such that the rotor engaging member of the unitizing element is retained within the groove on the rotor annul engagement flange; further providing a stator comprising an annular engagement flange extending in an axial direction comprising a groove on a radial side thereof; and finally engaging the rotor and unitizing element with the stator such that the stator engaging member deflects onto the void until the unitizing element is in position, then the stator engaging member extends into the area of the stator groove.

A feature of the present invention is the new design of a uniquely shaped unitizing element. The unitizing element is annular with a cross section that is substantially rectangular to fit within the confines of grooves in the rotor and stator. The unitizing element further comprises a stator engaging member to lockingly engage a groove on the stator and a rear member that extends to contact the rear wall of the stator to prevent axial movement. If axial movement shifts the rotor toward the stator, the unitizing element will make contact before any wear of the rotor and stator can occur. The rear member on this ring is precisely designed to contact the back wall of the stator before the rotor contacts the stator. This feature will prevent any wear of the main components and preserve the labyrinth pathway.

The rotor, the stator, and the unitizing element can comprise two or more portions each. The feature can facilitate the assembly and disassembly of the seal, which can lower the downtime of equipment, and therefore can prevent expenses. This can create an efficient, easy to service solution.

Conventional sealing devices using a split labyrinth seal do not use a unitizing element to create the seal. Additionally, these sealing devices do not have a unitizing ring element adhered to a rotor groove.

In one embodiment, a sealing assembly for sealing a bearing housing and a rotating shaft that has an axis of rotation has a stator, a rotor, and a unitizing element. The stator has a first portion and a second portion aligned along a plane extending through a diameter of the stator and the axis of rotation. The stator also has an annular engagement flange extending in an axial direction having a groove on a radial side thereof. The rotor has a first portion and a second portion aligned along a plane extending through a diameter of the rotor and the axis of rotation. The rotor also has an annular engagement flange extending in an axial direction having a groove on the radial side thereof. The annular unitizing element has a first unitizing element portion and a second unitizing element portion aligned along a plane extending through a diameter of the annular unitizing element and the axis of rotation, a stator engaging member that engages the stator groove, a rotor engaging member that engages the rotor groove, and a rear member having a top edge, a bottom edge, and a side edge. The side edge of the rear member extends from the unitizing element to engage the stator. The radially outer surface of the unitizing element has two areas of differing diameter, one corresponding to the rotor engaging member and the other corresponding to the rear member.

In another embodiment, an assembly for sealing a housing and a shaft rotatable relative to and extending through the housing has a stator, a rotor, and a unitizing element. The stator has at least two stator portions and an annular engagement flange extending in an axial direction having a groove on a radial side thereof. The rotor has at least two portions and an annular engagement flange extending in an axial direction having a groove on the radial side thereof. The annular unitizing element has at least two portions, a stator engaging member that engages the stator groove, a rotor engaging member that engages the rotor groove, and a rear member having a top edge, a bottom edge, and a side edge. The rear member side edge extends from the unitizing element to engage the stator. The radially outer surface of the unitizing element has two areas of differing diameter, one corresponding to the rotor engaging member and the other corresponding to the rear member.

In yet another embodiment, a method having the following steps forms a seal for a bearing housing and a rotating shaft having an axis of rotation. A first semi-annular stator portion is aligned with a second semi-annular stator portion along a stator plane extending through a diameter of the stator and the axis of rotation to form a stator. A first rotor engaging member of a first semi-annular unitizing element portion is engaged to a first semi-annular rotor portion along a rotor groove on a radial side of a first rotor engagement flange of the first semi-annular rotor portion. A second rotor engaging member of a second semi-annular unitizing element portion is engaged to a second semi-annular rotor portion along a rotor groove on a radial side of a second rotor engagement flange of the second semi-annular rotor portion. A first stator engaging member of a first semi-annular unitizing element portion is engaged to a first semi-annular stator portion along a stator groove on a radial side of a first stator engagement flange of the first semi-annular stator portion. A second stator engaging member of a second semi-annular unitizing element portion is engaged to a second semi-annular stator portion along a stator groove on a radial side of a second stator engagement flange of the second semi-annular stator portion. A first side edge of a first rear member of the first semi-annular unitizing element portion is aligned with the stator groove. A second side edge of a second rear member of the second semi-annular unitizing element portion is aligned with the stator groove.

As will be realized by those of skill in the art, many different embodiments of a labyrinth unitizing element and method of assembly according to the present invention are possible. Additional uses, objects, advantages, and novel features of the invention are set forth in the detailed description that follows and will become more apparent to those skilled in the art upon examination of the following or by practice of the invention.

DETAILED DESCRIPTION OF THE INVENTION

The present invention comprises a novel unitizing element for use between a rotating shaft and a bearing housing comprising a stator. This unitizing element is an annular ring shaped to fit the grooves formed in the rotor and stator. This unitizing element unitizes the rotor and stator, preventing separation and restricting movement. This unitizing element also contains a rear member which, in the case of axial movement, will provide a non-metallic component to prevent contact of the rotor and stator.

In another aspect of the present invention, a labyrinth sealing assembly is provided. The labyrinth sealing assembly comprises a stator engaging a bearing housing, and a rotor engaging a rotating shaft. A labyrinth pathway is defined between the two components to prevent the migration of lubricants and/or contaminants in either direction. The stator comprises an axially extending flange with a groove. This groove mates with a similar groove on the rotor. Contained within the resulting cavity is the annular unitizing element.

In another embodiment of the present invention, a method for assembling a sealing assembly is provided. A unitizing element is employed between a rotating shaft and a bearing housing to prevent leakage of lubricant from the housing and entry of contaminants into the housing. Further, the unitizing element unitizes the sealing assembly and prevents contact of the rotor and stator.

The invention will now be further described by way of specific embodiments thereof, with the understanding that the present disclosure is to be considered as an exemplification of the principles of the invention. Exemplary embodiments of the present invention are shown in the figures where like numerals refer to like aspects of the various embodiments.

Figure 1:
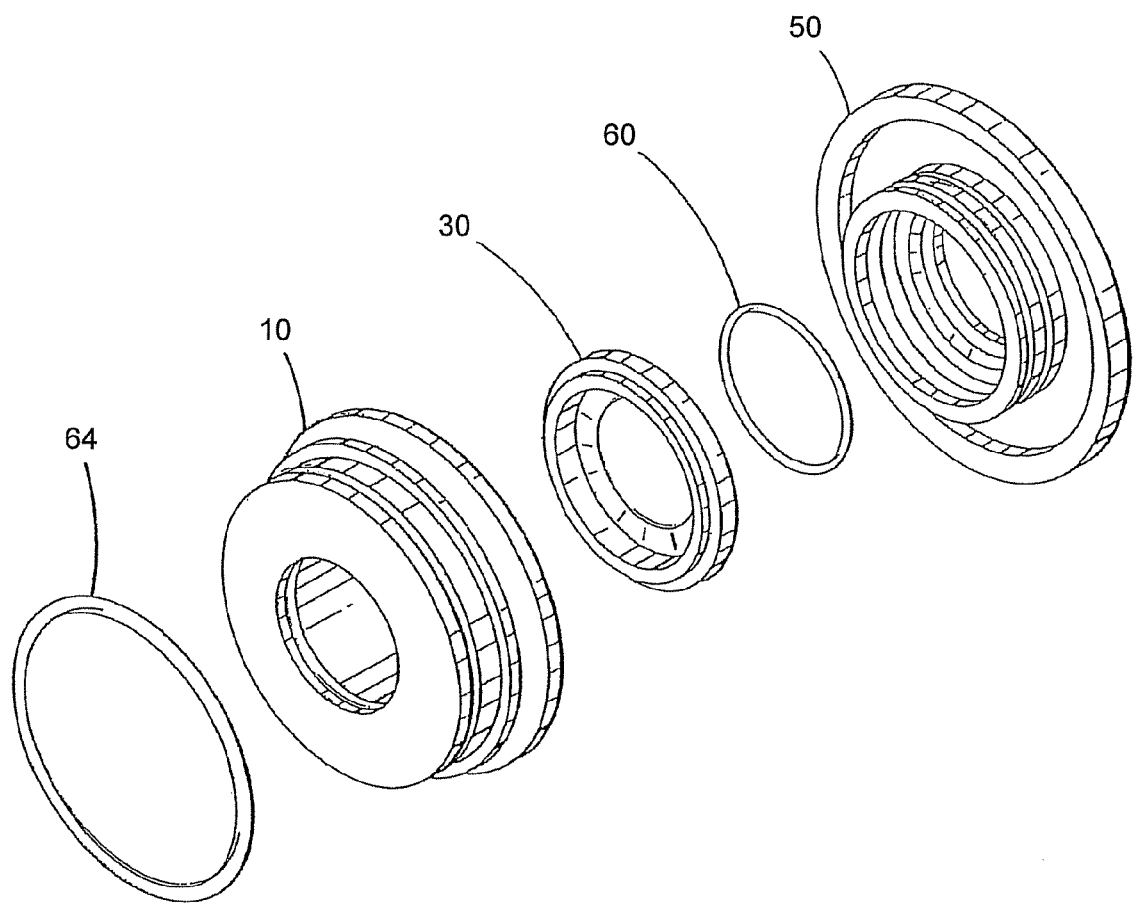
FIG. 1 is an isometric exploded view of a sealing assembly in an embodiment of the present invention.

Referring to FIG. 1, the unitizing element of the present invention shown in a sealing assembly which generally comprises a stator 10 sealingly engaged to the bearing housing by an O-ring 64, a rotor 50 which is sealingly engaged to the shaft by an O-ring 60, and a unitizing element 30 located between the rotor 50 and the stator 10. As the rotor turns, the unitizing element 30 prevents the rotor from contacting the stator by providing a low friction buffer between the two components and further retains lubrication within and excludes contaminants from the bearing housing.

Figure 2:
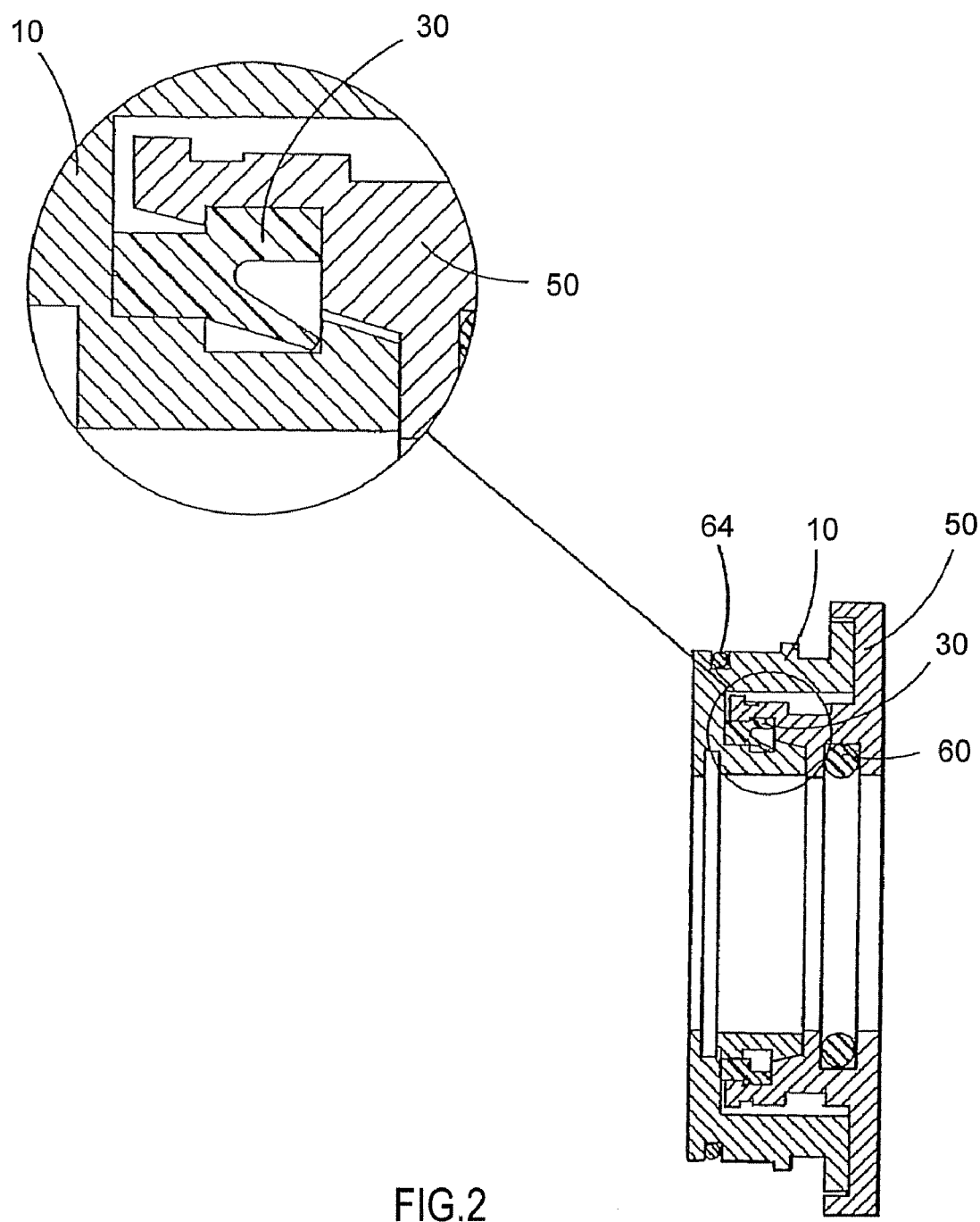
FIG. 2 is a cross sectional view of an embodiment of the present invention comprising a cross section of the sealing assembly including an enlarged view of the unitizing element and surrounding area.
Figure 4:
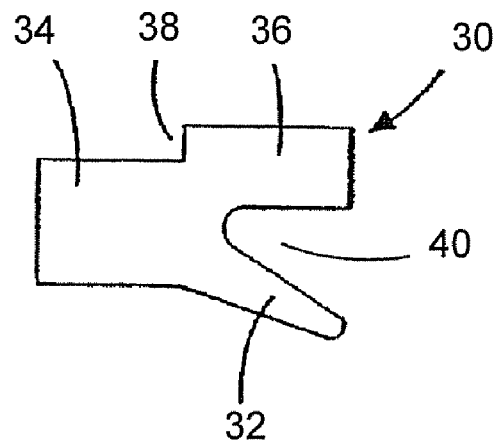
FIG. 4 is a cross sectional view of a unitizing element of an embodiment of the present invention.

The unitizing element may be viewed in more detail in FIGS. 2 and 4, which show a cut away view of the assembly, and a cross sectional view of the unitizing element, respectively. Viewing a cross section, the unitizing element comprises a rotor engaging member 36, a rear member 34 and an stator engaging member 32.

In one embodiment of the present invention, the radially outer surface of the unitizing element comprises two areas of differing diameter. The differing diameters include, one diameter in the area of the rear member 34 and a differing diameter in the area of the rotor engaging member 36. A wall 38 is formed by the disparity in diameter between the rear member 34 and the rotor engaging member 36. This wall 38 functions to retain the unitizing element within a rotor 50 during assembly, and to unitize the rotor 50 and stator 10 after assembly. In a preferred embodiment of the present invention, the wall 38 is positioned at about the axial midpoint of the unitizing element. However, one skilled in the art will recognize the position of the wall 38 will vary depending on the functionality required of the unitizing element and the configuration of the rotor and stator assembly. In a preferred embodiment of the present invention, the wall 38 is substantially perpendicular to the axis of rotation.

The stator engaging member 32 extends from the radially inner side of the unitizing element 30. The stator engaging member 32 extends from about the midpoint of the unitizing element at an angle. The length and exact location of the stator engaging member will depend upon rotor and stator characteristics as well as ease of assembly concerns. The stator engaging member must have sufficient strength to unitize the sealing assembly, while being flexible enough to deflect during assembly. There is a void 40 formed by the area between the rotor engaging member 36 and the stator engaging member 32. This void 40 provides an area for the stator engaging member 32 to deflect into when the rotor, stator, and unitizing element are brought together into a sealing assembly.

While the particular shape of the unitizing element 30 including the wall 38, rear member 34, rotor engaging member 36 and stator engaging member 32 are critical to its operation, the exact dimensions of these components as well as that of the unitizing element itself will vary according to the intended use of the unitizing element. These modifications in dimension will be apparent to one skilled in the art and fall within the scope of this invention. Thus, the unitizing element of the present invention is not limited to sealing applications of any particular size, and is equally applicable to a wide range of uses.

The unitizing element 30 of the present invention comprises a material suitable for its intended purpose depending on the particular temperature, pressure, coefficient of friction, and other operating characteristics. Common materials for use in the unitizing element of the present invention comprise fluorinated polymers or resins. In one embodiment of the present invention, the unitizing element 30 comprises a lubricious plastic material. In a preferred embodiment of the present invention, the unitizing element comprises polytetrafluoroethylene (PTFE).

In a most preferred embodiment of the present invention, the unitizing element 30 comprises filled PTFE. Filled PTFE comprises PTFE with a filler dispersed throughout. Fillers include, but are not limited to, structural fillers such as glass, and lubricants such as graphite, molybdenum disulphide, and other solid lubricants.

In another aspect of the present invention, a sealing assembly is provided comprising the unitizing element 30 of the present invention. An example of a sealing assembly of the present invention may be best viewed in FIGS. 1 and 2. The sealing assembly comprises a rotor 50, stator 10, and unitizing element 30. The rotor 50 is sealingly engaged to a shaft running through the center of the sealing assembly. The rotor 50 comprises an axially extending annular flange 52 comprising a rotor groove 54 located on a radially inward side of the flange 52. The stator 10 is sealingly engaged to a bearing housing 68 and comprises an axially extending annular flange 12 comprising a stator groove 14 located on a radially outward side of the flange 12. A unitizing element 30 comprising an rotor engaging member 36, an stator engaging member 32, and a rear member 34 resides within the area formed by the space between the rotor annular flange 52 and the stator annular flange 12. More precisely, the unitizing element 30 resides partially within each of the rotor groove 54 and stator groove 14 with the rear member 34 extending toward the stator rear wall 20.

Figure 3:
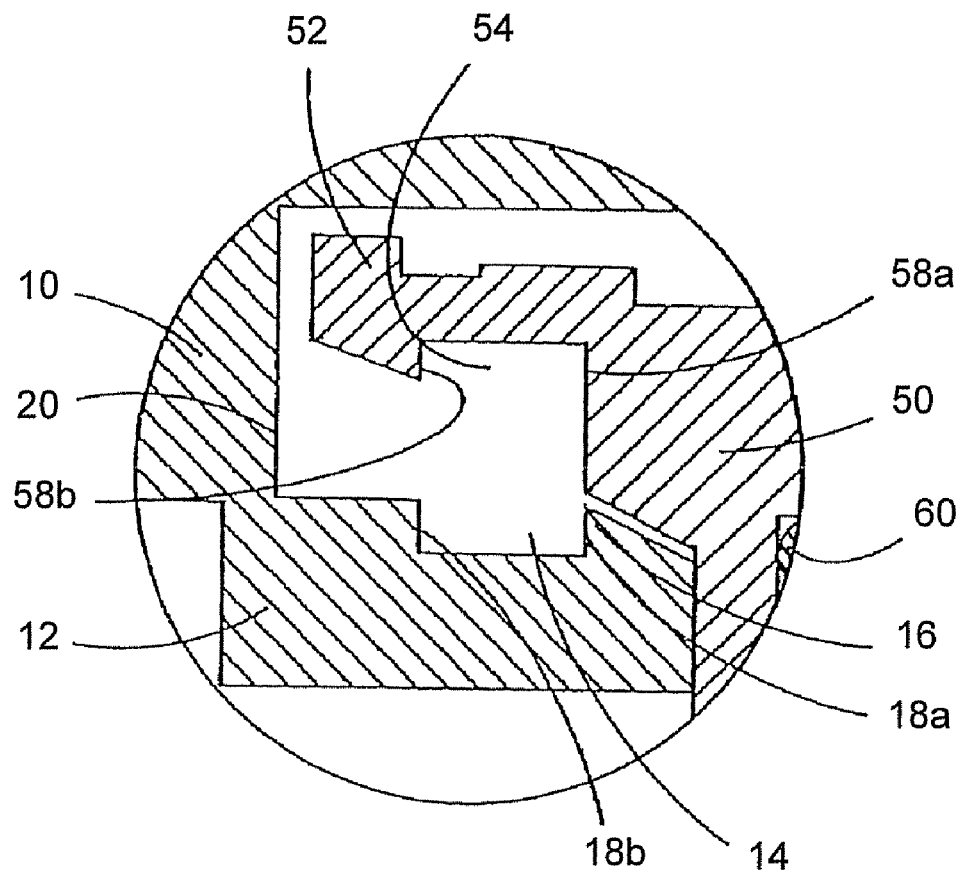
FIG. 3 is a cross sectional view of a rotor and stator configuration without the unitizing element in an embodiment of the present invention.

FIG. 3 shows the detailed portion of FIG. 2 without the unitizing element in place. In one embodiment of the present invention, the sealing assembly includes a rotor 50, which is sealingly engaged to the shaft by an O-ring 60. The rotor includes an annular flange 52, which contains a groove 54 located on a radially inward side thereof. The groove 54 comprises two opposing walls 58a and 58b. Similarly, the stator 10 comprises an annular flange 12 containing a groove 14. The stator groove 14 also comprises two opposing walls 18a and 18b. In a preferred embodiment of the present invention, the opposing walls of the rotor groove 58a, 58b and the opposing walls of the stator groove 18a, 18b are about perpendicular to the axis of the shaft.

In one embodiment of the present invention, shown in FIG. 3, each opposing wall of the rotor groove is axially aligned with the corresponding opposing wall of the stator groove, such that opposing wall 58a is axially aligned with opposing wall 18a and opposing wall 58b is axially aligned with opposing wall 18b. This configuration forms an area of rectangular cross section in which the rotor engaging member 36 and inner engagement member 32 of the unitizing element 30 are housed.

In a preferred embodiment of the present invention, at least one of the walls of the stator groove 54 and corresponding wall of the rotor groove 14 are offset, such that one of the pairs of rotor groove wall 58a or 58b and corresponding stator groove wall 18a or 18b are not in axial alignment.

Figure 5:
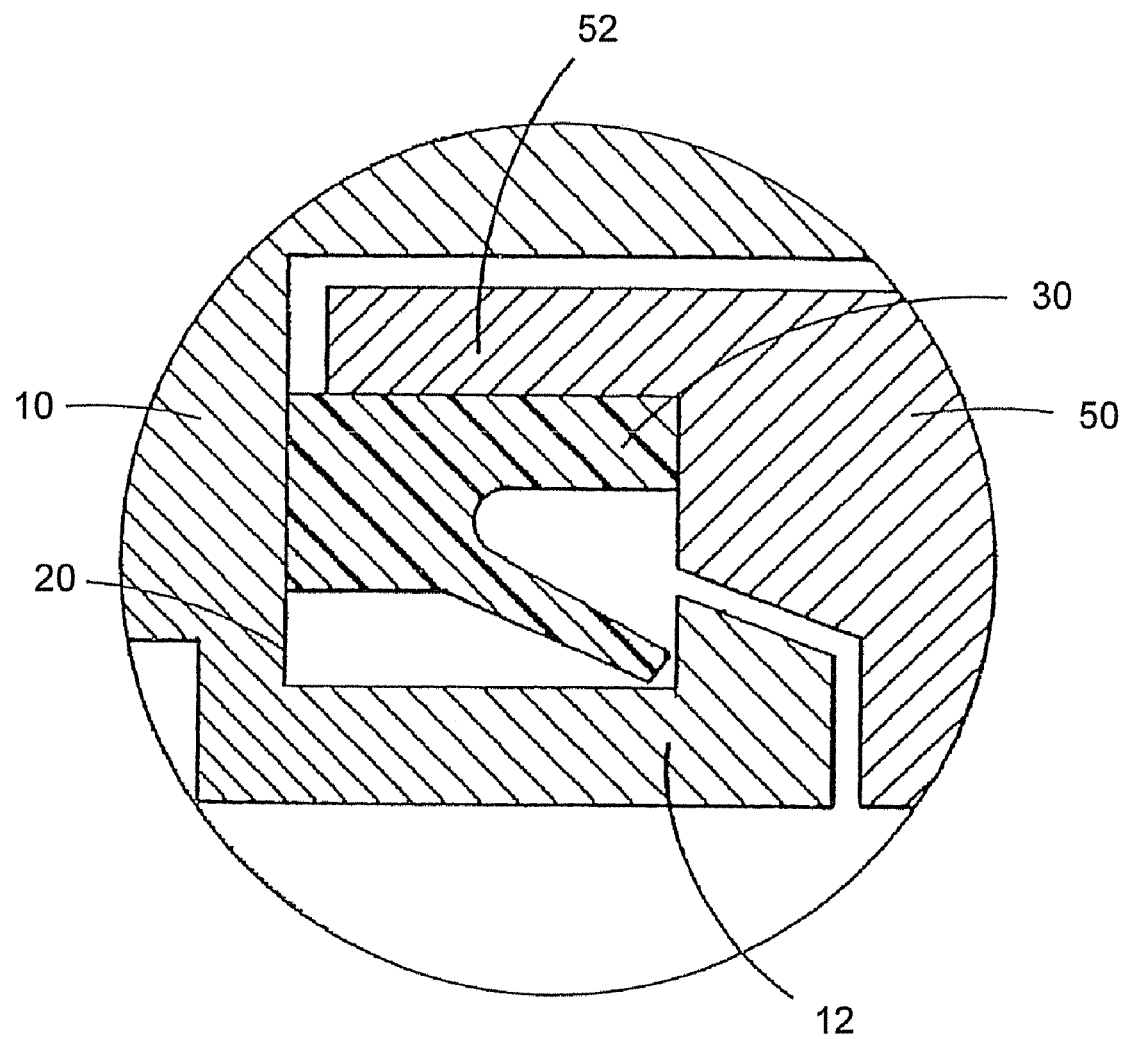
FIG. 5 is a cross sectional view of an embodiment of the present invention comprising a cross section of the sealing assembly including a rotor, stator, and unitizing element.

One example of this offset is shown in FIG. 5 wherein one wall of the stator groove 18b comprises the rear wall of the stator 20. FIG. 5 also illustrates another embodiment of the present invention in which one wall of the rotor groove is eliminated such there is no rotor groove wall 58b as is shown in FIG. 3. In this embodiment, the unitizing element is press fit into the rotor. The unitizing element of the press fit embodiment comprises a constant outer diameter throughout the length of the unitizing element.

Figure 7:
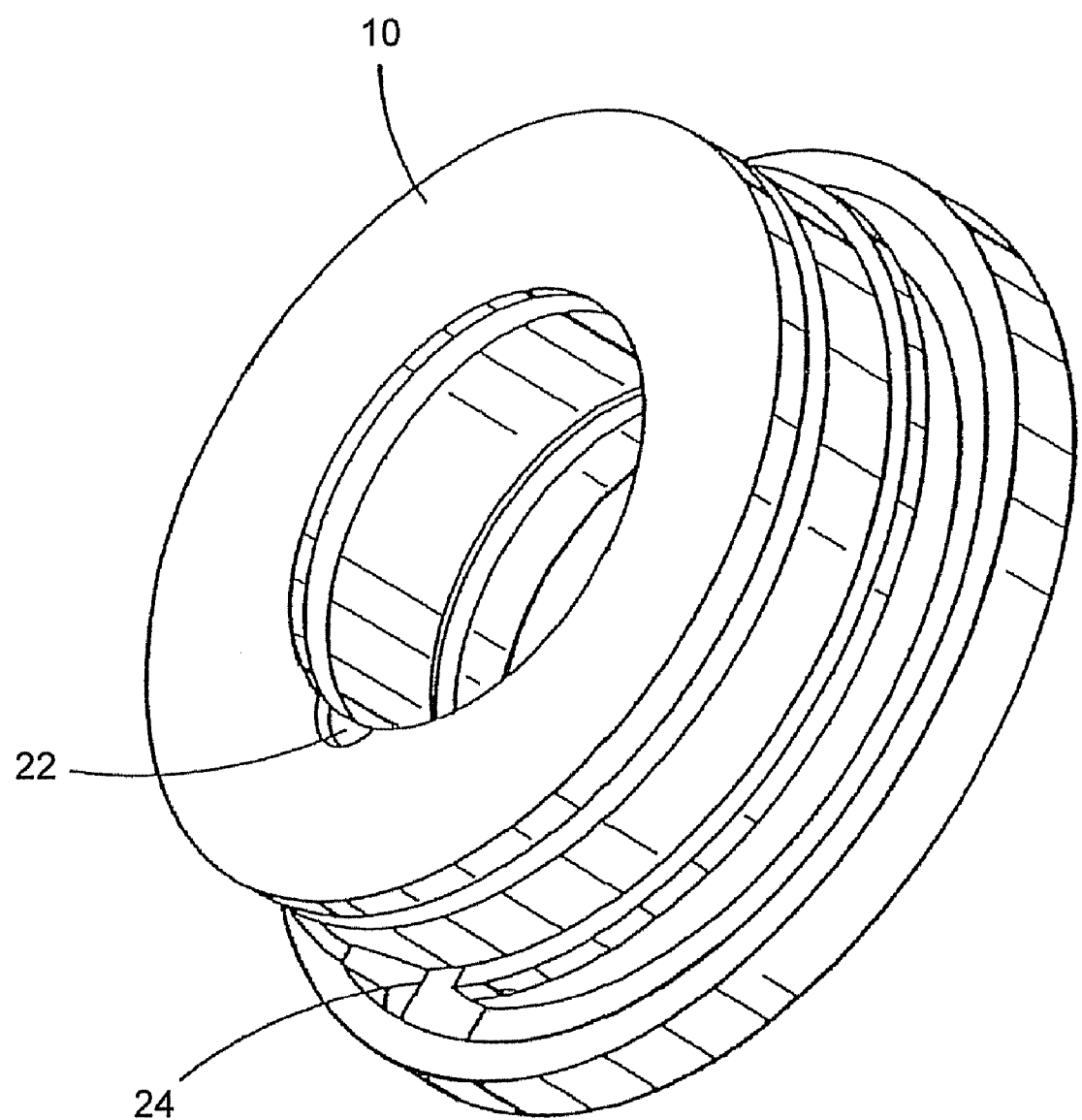
FIG. 7 is a isometric view of the sealing assembly in an embodiment of the sealing assembly of the present invention showing a lubricant drainage port and a contaminant expulsion port.

Referring to FIG. 7, in another embodiment of the present invention, the stator 10 further comprises an oil drainage port 22 on the interior shaft side of the seal to facilitate drainage of oil that has migrated into the unitizing element area. Over time, lubricant may seep past the stator and unitizing element. The oil drainage port 22 provides a pathway for oil to pass back into the bearing cavity side of the seal to lubricate the rotating shaft.

In a further embodiment of the present invention, the stator 10 further comprises an expulsion port 24 located on the stator's atmospheric side. The expulsion port 24 allows any contaminants that migrate into the seal area to be expelled from the assembly.

In a preferred embodiment of the present invention, the sealing assembly comprises the rotor 50 and stator 10 with the unitizing element 30 housed therein. The rotor engaging member 36 of the unitizing element 30 engages the rotor groove 54 such that the axially outer sides of the rotor engaging member 36 contact the opposing walls of the rotor groove 54. In a most preferred embodiment of the present invention, the rotor engaging member 36 "floats" within the rotor groove 54 so as to minimize contact and friction during operation. When there is an axial shift of the rotor and stator relative to each other, the rotor engaging member 36 will then contact the corresponding wall of the rotor groove 54.

Similarly, the stator engaging member 32 contacts the stator groove and/or the groove wall 18a. During operation, the unitizing element "floats" within the cavity formed between the rotor and stator. However, the stator engaging member 32, being flexibly attached to the unitizing element 30, does provide a means to keep the unitizing element 30 in position by contacting the wall 18a of the stator groove 14 should the assembly shift during operation.

In a further embodiment of the present invention, the unitizing element 30 also contains a rear member 34. The rear member 34 prevents the rotor and stator from directly contacting one another in the event of axial movement toward each other. If the rotor shifts toward the stator, the rear member 34 of the unitizing element 30 will contact the rear wall of the stator 20 before the rotor and stator make direct contact. The rotor 50 will contact and press against the unitizing element 30 via one of the opposing walls 58a of the rotor groove 54. This action will force the rear member 34 of the unitizing element against the stator rear wall 20. Since the unitizing element is preferably constructed of a lubricious plastic material, the frictional force between the unitizing element 30 and the rotor 50, and the unitizing element 30 and the stator 10 will be significantly less than direct contact between the rotor 50 and stator 10. The unitizing element 30 thereby provides a wear-resistant buffer between the rotor and stator components. This serves to prolong the useful life of the rotor and stator by minimizing wear of these two parts. When the unitizing element 30 reaches the end of its useful life, it may be easily replaced, with less operational downtime and replacement cost than that associated with replacing the rotor and stator.

Figure 6:
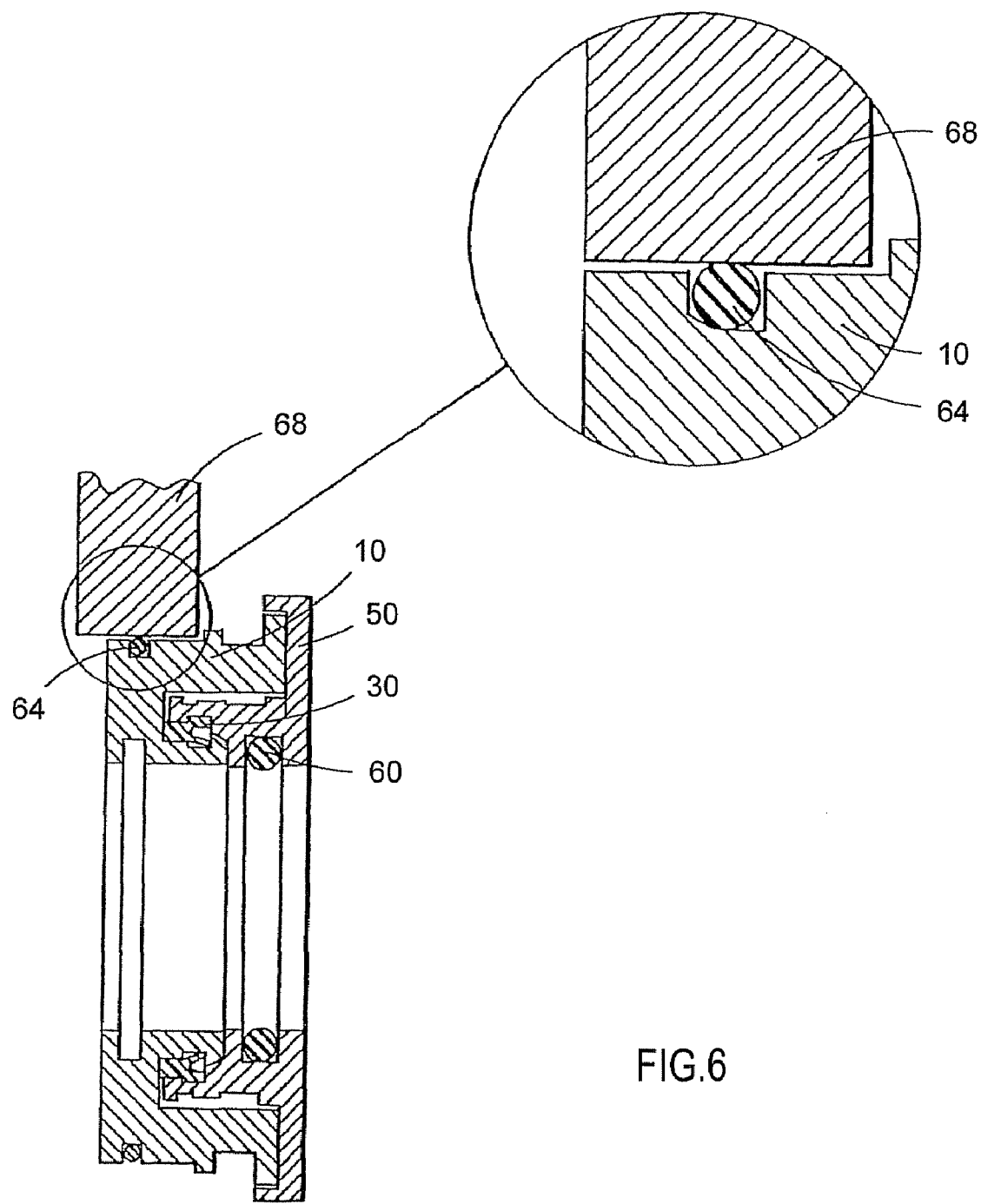
FIG. 6 is a cross sectional view of the sealing assembly of an embodiment of the present invention with an enlarged view of the stator O-ring.

As shown in FIG. 6, in another embodiment of the present invention, the stator 10 is sealingly engaged to the bearing housing 68 with an O-ring 64. The O-ring resides within a groove formed in the radially outer side of the stator. The groove is uniquely formed such that the bottom surface of the groove is sloped such that one side of the groove is deeper than the opposing side of the groove. In the configuration shown in FIG. 6, the side most proximate the body of the bearing housing is less deep than the side remote from the body of the bearing housing. The effect of this is to cause the O-ring to compress and increase pressure in the bearing housing should the stator begin to move away from the body of the bearing housing. This increased pressure will halt the movement of the stator.

The specific angle and position shown in FIG. 6 are exemplary only. In various embodiments, the sloping surface may comprise a portion of the groove bottom, or the entirety of the groove bottom. It is to be understood that this principle and sloped O-ring groove can be used to secure the rotor 50 to the rotating shaft through a similar groove on the radially inner surface of the rotor. Additionally, a plurality of possible groove shapes can be used to increase compression of the O-ring when undesirable axial movement occurs.

In another aspect of the present invention, a method for assembling a sealing assembly is provided. During assembly, the unitizing element 30 of an embodiment of the present invention is inserted between the stator 10 and the rotor 50 to form a sealing assembly. The preferred method for assembling the sealing assembly comprises first engaging the unitizing element 30 and the rotor 50, then engaging the unitizing element and rotor with the stator 10 and bearing housing.

The method further comprises, providing a unitizing element 30 comprising: a rotor engaging member 36, a stator engaging member 32, and a rear member 34, and providing a rotor comprising a rotor annular flange 52 extending in an axial direction and having a groove 54 therein; and positioning the unitizing element 30 within the rotor 50 such that the rotor engaging member 36 of the unitizing element engages the groove 54 in the annular flange of the rotor. Contact between the rotor engaging member 36 and the opposing walls of the rotor groove 58a, 58b securely retains the unitizing element in position.

The assembled rotor 50 and unitizing element 30 are engaged to the stator 10. The stator 10 comprises an annular flange 12 extending toward the rotor 50 and having a groove 14 on a radially outer side thereof. As the unitizing element 30 slides around the annular flange 12, the stator engaging member 32 is deflected and deforms into the void 40 to allow the unitizing element to slide into position around the stator annular flange. Once the stator engaging member 32 has been pushed past the stator lip 16, the stator engaging member 32 is free to flex back into an extended position within the stator groove 14. The stator engaging member 32, in the extended position, will extend in the groove 14 past the outer circumference of the stator lip 16. In this position, the stator engaging member 32 will serve to provide a means for retaining the unitizing element 30 and rotor 50 with the stator 10 by preventing axial movement of the rotor away from the stator.

In this position, the unitizing element 30 unitizes the rotor 50 and the stator 10 by filling the void therebetween and contacting the opposing walls of the rotor groove 58a, 58b. The engaging member 32 rests within the groove 14 on the stator 10, but does not contact opposing walls 18a, 18b during normal operation. If and when axial force is applied moving the rotor 50 away from the stator 10, opposing wall 58b will contact the rotor engaging member 36 in the area of the wall 38. This will force the unitizing element 30 to move with the rotor 50. Movement of the unitizing element 30 will be arrested by contact of the stator engaging member 32 with opposing wall 18a of the stator groove 14. By this action, the sealing assembly comprising the rotor, unitizing element, and stator, is unitized. The only means for disassembling the sealing assembly is to apply enough axial force to irreparably damage the unitizing element.

In addition to the unitizing effect in the sealing assembly, the unitizing element also creates a non-contacting relationship between the rotor and stator. In the event of axial movement of the rotor 50 toward the stator 10, the rotor will contact the unitizing element 30 and force the rear member 34 into contact with the stator rear wall 20. The unitizing element 30 is designed such that the rear member 34 extends toward the stator farther than the rotor annular flange 52. Thus, the rotor annular flange is prevented from contacting the rear wall of the stator, thereby increasing the useful life of the rotor and stator by preventing undue wear of the components.

In one embodiment, any or all of the rotor, the stator, the unitizing element, and the O-rings can each be assembled from more than one portion. In an exemplary embodiment, referring to FIG. 8, the stator and the rotor can each be assembled from two portions. As shown in this exemplary embodiment, this configuration can facilitate the assembly and disassembly of the seal, which can reduce the downtime of equipment, and therefore can lower expenses. Rotor portions 810, 820 can be aligned along a plane extending through a diameter of the rotor and the axis of rotation. The first portion 810 of the rotor can have a first edge 840 and a second edge 850. The second portion 820 of the rotor 800 can have a first edge 870 and a second edge 880. The first edge 840 of the first portion 810 of the rotor can align with the second edge 880 of the second portion 820 and the first edge 870 of the second portion 820 of the rotor can align with the second edge 850 of the first portion 810 to form the rotor.

Figure 9:
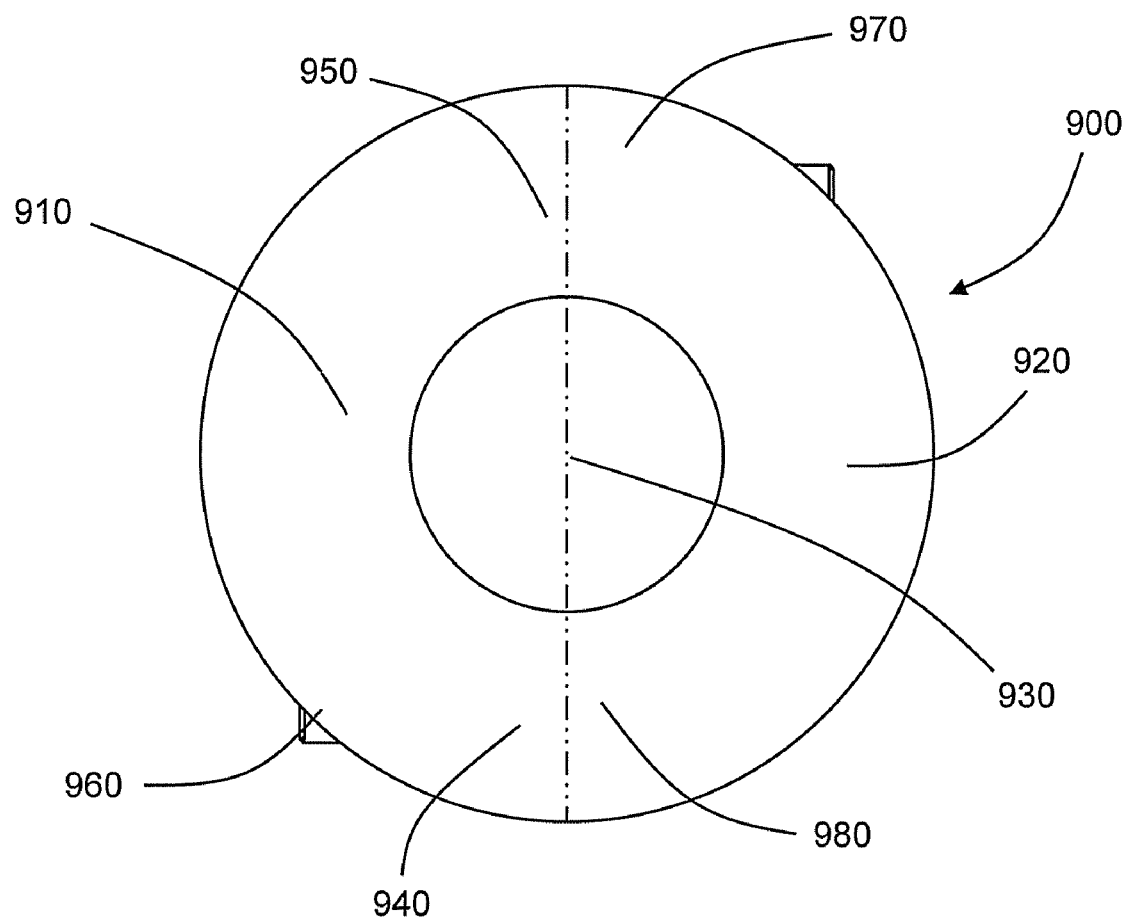
FIG. 9 is an top view of the rotor component according to an embodiment of the present invention.

Referring to FIG. 9, a top view of a rotor 900 is shown according to an exemplary embodiment. The rotor 900 can be assembled from two portions. Rotor portions 910, 920 can be aligned along a plane extending through a diameter 930 of the rotor 900 and the axis of rotation. The first portion 910 of the rotor 900 can have a first edge 940 and a second edge 950. The second portion 920 of the rotor 900 can have a first edge 970 and a second edge 980. The first edge 940 of the first portion 910 of the rotor 900 can align with the second edge 980 of the second portion 920 and the first edge 970 of the second portion 920 of the rotor 900 can align with the second edge 950 of the first portion 910 to form the rotor 900.

Referring back to FIG. 8, stator portions 812, 822 can be aligned along a plane extending through a diameter of the stator and the axis of rotation. The first portion 812 of the stator can have a first edge 842 and a second edge 852. The second portion 822 of the stator can have a first edge 872 and a second edge 882. The first edge 842 of the first portion 812 of the stator can align with the second edge 882 of the second portion 822 and the first edge 872 of the second portion 822 of the stator can align with the second edge 852 of the first portion 812 to form the stator.

Figure 10:
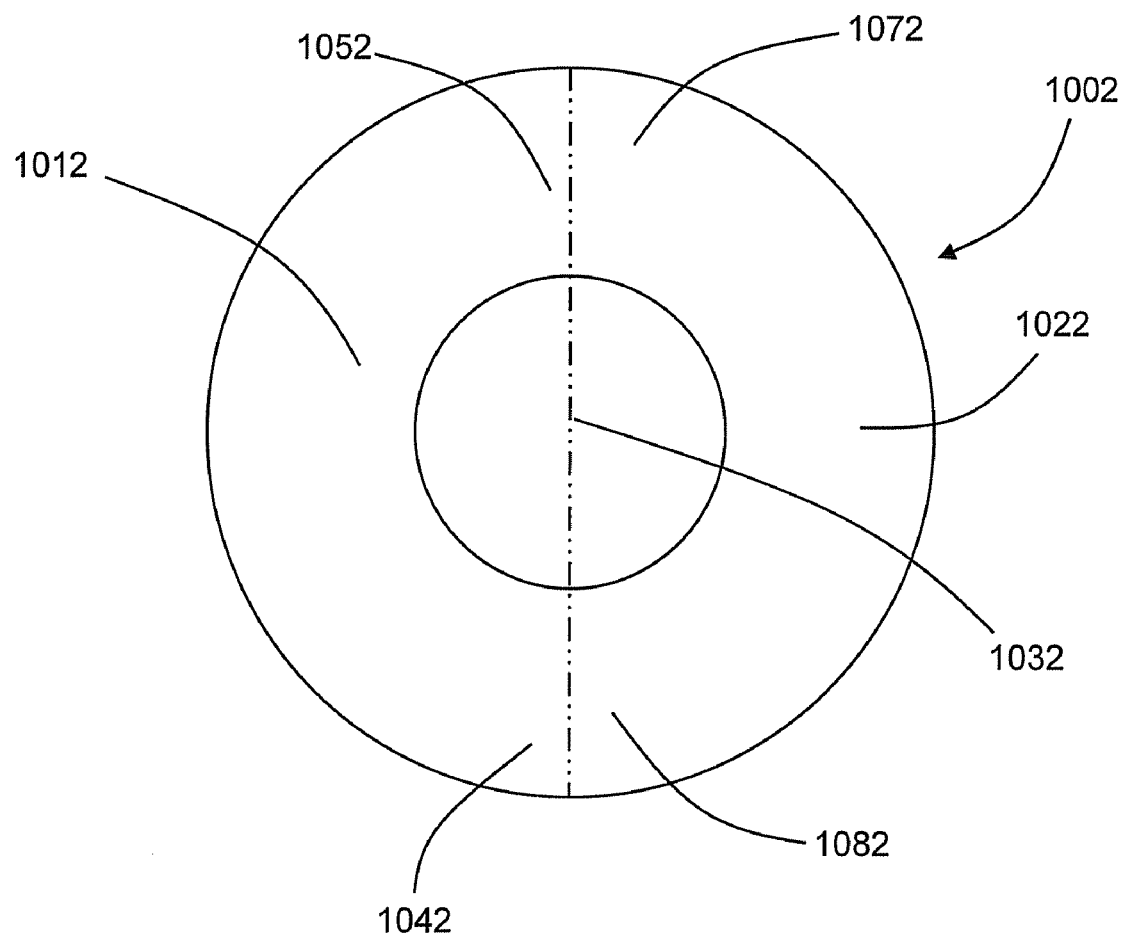
FIG. 10 is an top view of the stator component according to an embodiment of the present invention.

Referring to FIG. 10, a top view of a stator 1002 is shown. A stator 1002 can be assembled from two portions. Stator portions 1012, 1022 can be aligned along a plane extending through a diameter 1032 of the stator 1002 and the axis of rotation. The first portion 1012 of the stator 1002 can have a first edge 1042 and a second edge 1052. The second portion 1022 of the stator 1002 can have a first edge 1072 and a second edge 1082. The first edge 1042 of the first portion 1012 of the stator 1002 can align with the second edge 1082 of the second portion 1022 and the first edge 1072 of the second portion 1022 of the stator 1002 can align with the second edge 1052 of the first portion 1012 to form the stator 1002.

Figure 11:
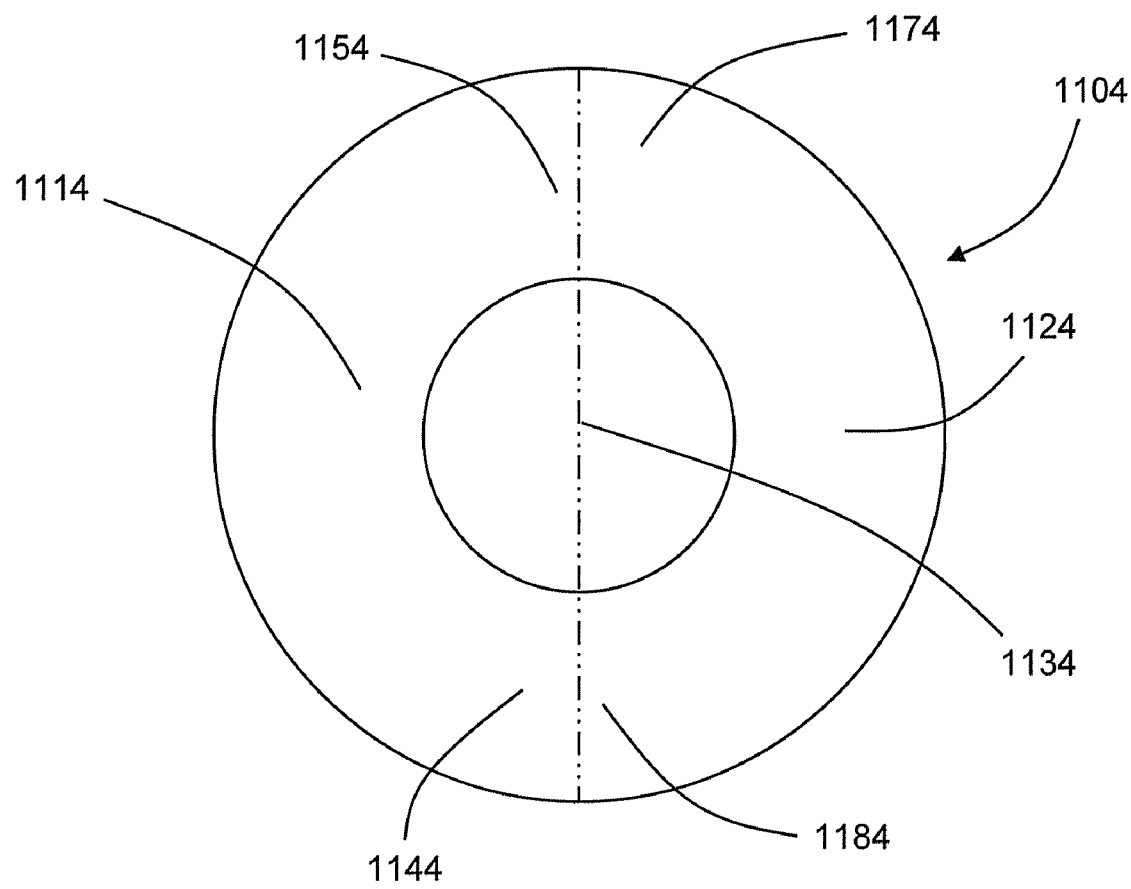
FIG. 11 is an top view of the unitizing element according to an embodiment of the present invention.

In another exemplary embodiment, referring to FIG. 11, a unitizing element 1104 can be assembled from two portions. Unitizing element portions 1114, 1124 can be aligned along a plane extending through a diameter 1134 of the unitizing element 1104 and the axis of rotation. The first portion 1114 of the unitizing element 1104 can have a first edge 1144 and a second edge 1154. The second portion 1124 of the unitizing element 1104 can have a first edge 1174 and a second edge 1184. The first edge 1144 of the first portion 1114 of the unitizing element 1104 can align with the second edge 1184 of the second portion 1124 and the first edge 1174 of the second portion 1124 of the unitizing element 1104 can align with the second edge 1154 of the first portion 1114 to form the unitizing element 1104.

Figure 12:
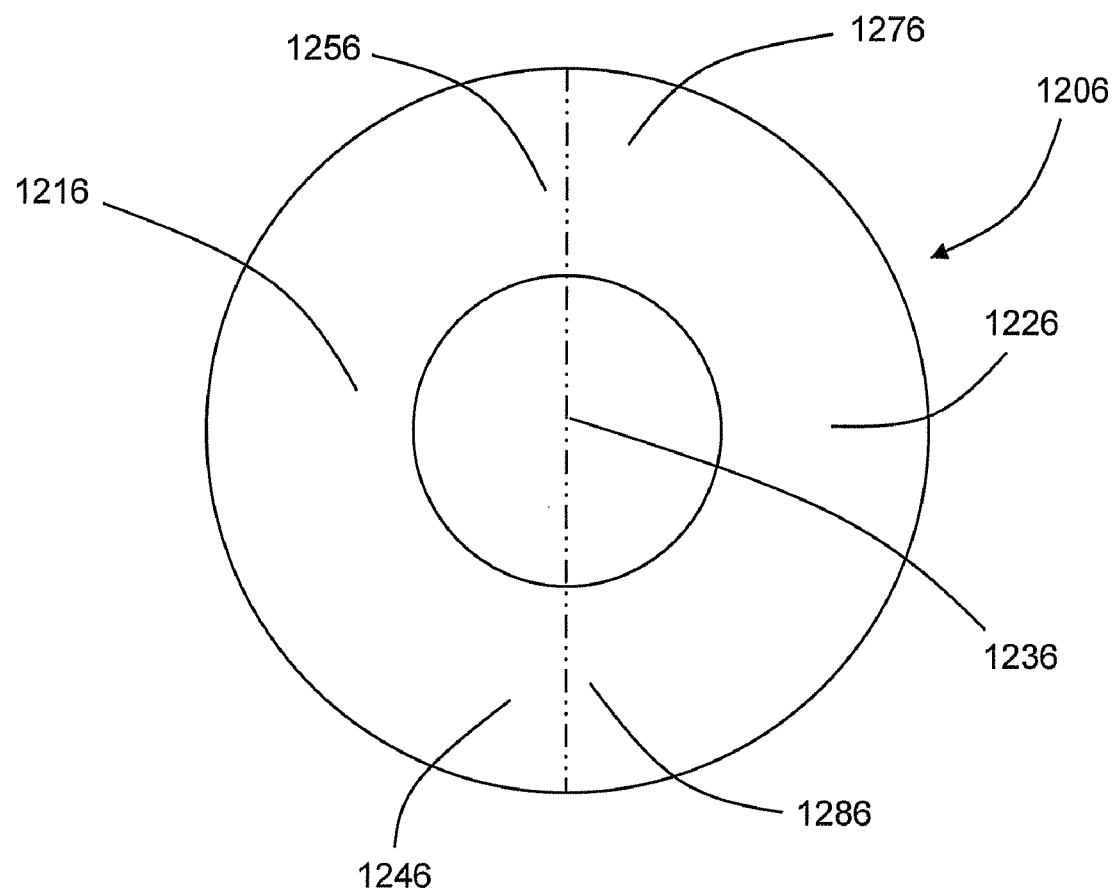
FIG. 12 is an top view of the rotor O-ring component according to an embodiment of the present invention.

In another exemplary embodiment, referring to FIG. 12, a rotor O-ring 1206 can be assembled from two portions. Rotor O-ring portions 1216, 1226 can be aligned along a plane extending through a diameter 1236 of the rotor O-ring 1206 and the axis of rotation. The first portion 1216 of the rotor O-ring 1206 can have a first edge 1246 and a second edge 1256. The second portion 1226 of the rotor O-ring 1206 can have a first edge 1276 and a second edge 1286. The first edge 1246 of the first portion 1216 of the rotor O-ring 1206 can align with the second edge 1286 of the second portion 1226 and the first edge 1276 of the second portion 1226 of the rotor O-ring 1206 can align with the second edge 1256 of the first portion 1216 to form the rotor O-ring 1206.

Figure 13:
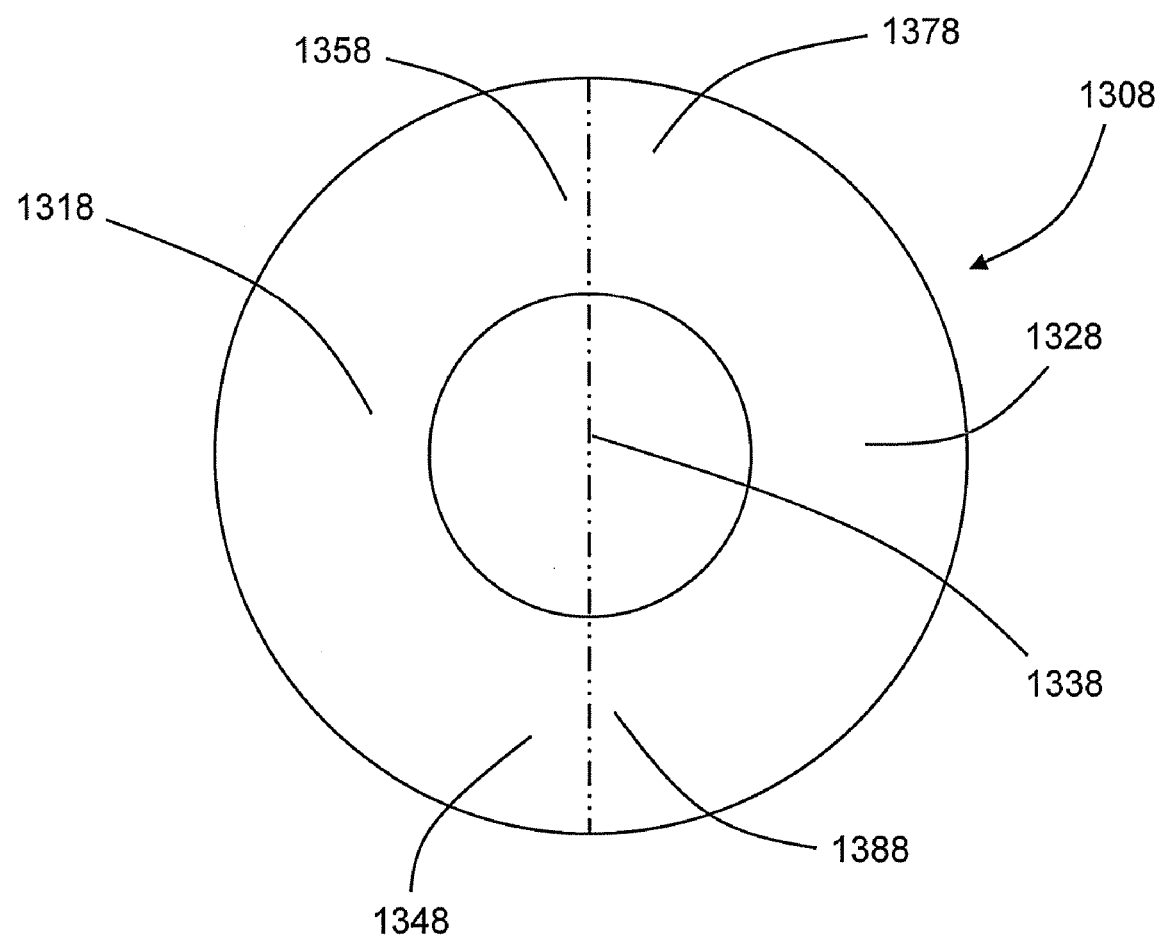
FIG. 13 is an top view of the stator O-ring component according to an embodiment of the present invention.

In another exemplary embodiment, referring to FIG. 13, a stator O-ring 1308 can be assembled from two portions. Stator O-ring portions 1318, 1328 can be aligned along a plane extending through a diameter 1338 of the stator O-ring 1308 and the axis of rotation. The first portion 1318 of the stator O-ring 1308 can have a first edge 1348 and a second edge 1358. The second portion 1328 of the stator O-ring 1308 can have a first edge 1378 and a second edge 1388. The first edge 1348 of the first portion 1318 of the stator O-ring 1308 can align with the second edge 1388 of the second portion 1328 and the first edge 1378 of the second portion 1328 of the stator O-ring 1308 can align with the second edge 1358 of the first portion 1318 to form the stator O-ring 1308.

In one embodiment, referring to FIGS. 12 and 13, the O-rings 1206, 1308 can be formed by overlapping the first edge 1246, 1348 of the first portion 1216, 1318 with the second edge 1286, 1388 of the second portion 1226, 1328 and overlapping the first edge 1276, 1378 of the second portion 1226, 1328 with the second edge 1256, 1358 of the first portion 1216, 1318. Various combinations of overlapping edges can be used in different embodiments of the invention.

In another embodiment, referring to FIGS. 10 and 13, the stator O-ring 1308 can be adhered to the stator 1002. The first stator O-ring portion 1318 can be adhered along the first stator portion 1012. The second stator O-ring portion 1328 can be adhered along the second stator portion 1022. Similarly, in another embodiment, referring to FIGS. 9 and 12, the rotor O-ring 1206 can be adhered to the rotor 900. The first rotor O-ring portion 1216 can be adhered along the first rotor portion 910. The second rotor O-ring portion 1226 can be adhered along the second rotor portion 920. The adherence can allow for ease of installation.

In yet another embodiment, referring to FIGS. 3, 9, and 11, the unitizing element 1104 can be adhered to the rotor 900 along the rotor groove 54. The first unitizing element portion 1114 can adhere to the rotor groove 54 along the first rotor portion 910 and the second unitizing element portion 1124 can adhere to the rotor groove 54 on the second rotor portion 920. The adherence can allow for ease of installation.

Figure 8:
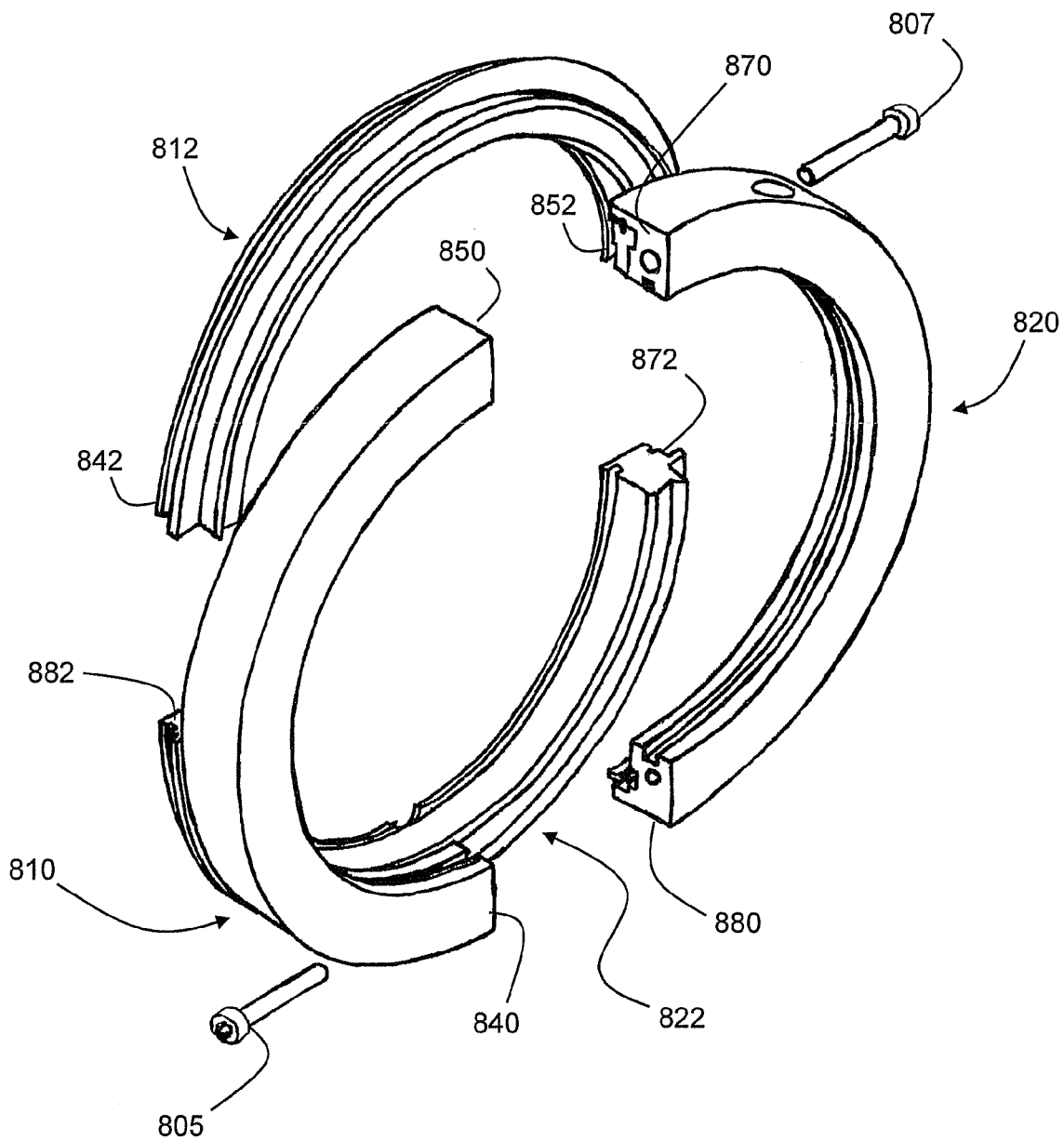
FIG. 8 is a isometric view of a partitioned sealing assembly according to an embodiment of the present invention.
Figure 14:
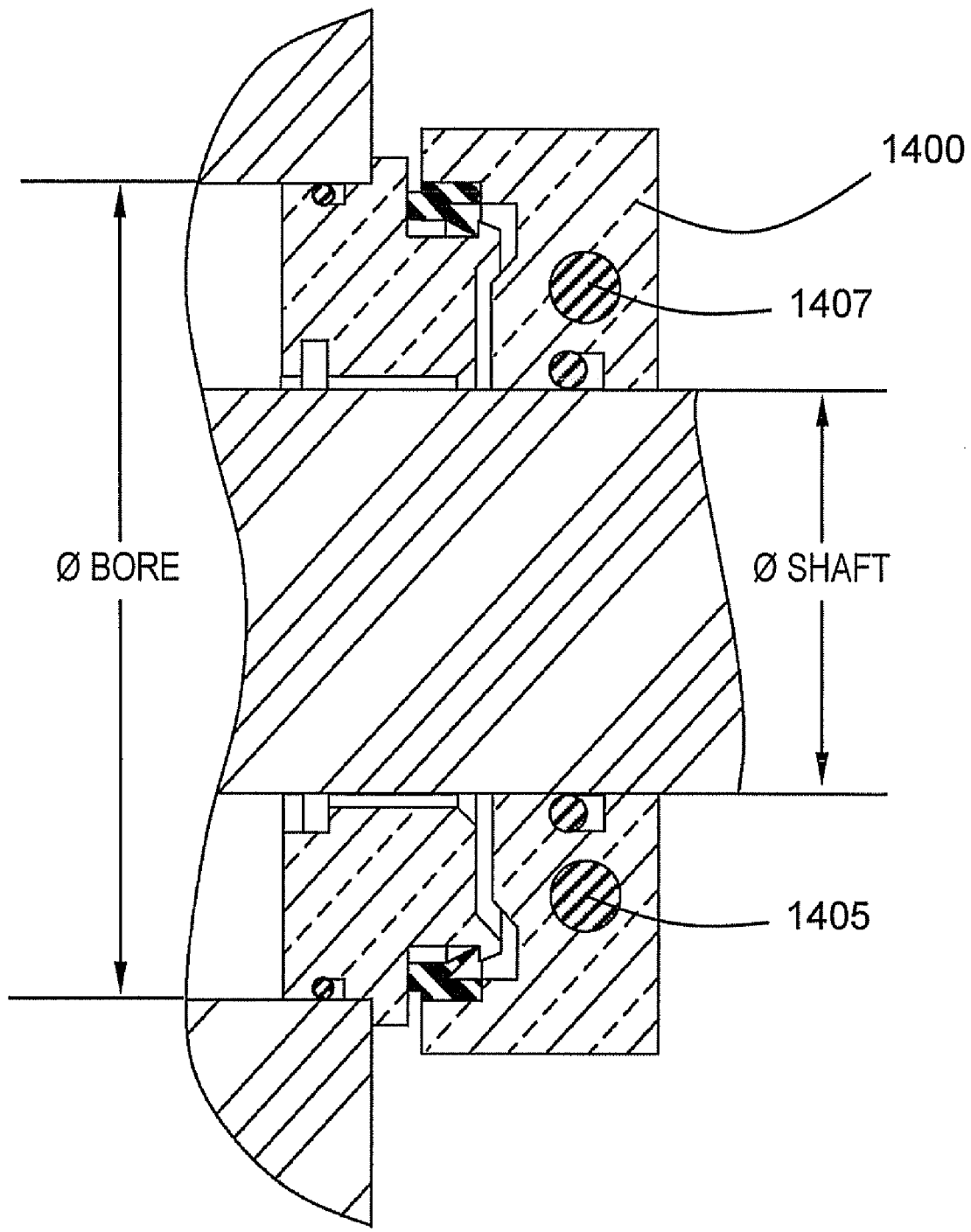
FIG. 14 is a cross sectional view of the sealing assembly according to an embodiment of the present invention.

In one embodiment of the invention, referring to FIGS. 8, 9, and 14, the rotor portions 810, 820 can be combined using at least one fastener. The at least one fastener can be in the form of screws 805, 807 which engage a the first portion 810 and the second portion 820 of the rotor 1400 at a receiver 1405, 1407, 960. The fastener can also be in the form of a snap ring, pins, bolts, or any other means known to one of ordinary skill in the art to fasten the two portions 910, 920 together. It is also understood that the fastener can be used to alternatively or additionally fasten other components, e.g., the stator portions, of the seal.

In another embodiment, referring to FIG. 8, the plane which the rotor portions 810, 820 are aligned along can be offset from the plane which the stator portions 812, 822 are aligned along. In one embodiment, the plane which the rotor portions 810, 820 are aligned along can be substantially perpendicular from the plane in which the stator portions 812, 822 are aligned. In an alternative embodiment, alignment planes can be at any desired variance with the other alignment planes.

In an exemplary embodiment, referring to FIG. 8, a seal can be formed by aligning two stator portions 812, 822 to form the stator and aligning the two rotor portions 810, 820 around the formed stator, wherein each portion engages a unitizing element. In this exemplary embodiment, the plane which the rotor portions 1010, 1020 are aligned can be substantially perpendicular to the plane which the stator portions 1110, 1120 are aligned.

In the exemplary embodiment described herein, the rotor, stator, unitizing element, and o-rings are shown each having a first portion and a second portion. However, it is understood that each of these components can be comprised of a single portion or can contain three or more portions. Additionally, the seal can comprise a combination of components having different portions, such as a rotor with a first and second portion and a stator having three portions.

In a further embodiment, portions of any or all of the rotor 900, the stator 1002, the unitizing element 1104, the rotor O-ring 1206, and the stator O-ring 1308 can be identical. Identical parts can facilitate manufacturing and can lower costs of manufacturing. For example, in one embodiment the stator can be formed from three identical portions. In another exemplary embodiment, the rotor can be formed from two identical portions.

Although the present invention has been described with reference to particular embodiments, it should be recognized that these embodiments are merely illustrative of the principles of the present invention. Those of ordinary skill in the art will appreciate that the unitizing element and assembly of the present invention may be constructed and implemented with other materials and in other ways and embodiments. Accordingly, the description herein should not be read as limiting the present invention, as other embodiments also fall within the scope of the present invention.

What is claimed is:

1. An assembly for sealing a bearing housing and a rotating shaft comprising an axis of rotation, the assembly comprising:
    a stator comprising:
        a first stator portion and a second stator portion aligned along a stator plane extending through a diameter of the stator and the axis of rotation; and
        a stator annular engagement flange extending in an axial direction comprising a stator groove on a radial side thereof;
    a rotor comprising:
        a first rotor portion and a second rotor portion aligned along a rotor plane extending through a diameter of the rotor and the axis of rotation; and
        a rotor annular engagement flange extending in an axial direction comprising a rotor groove on a radial side thereof; and
    an annular unitizing element comprising:
        a first unitizing element portion and a second unitizing element portion aligned along a unitizing element plane extending through a diameter of the annular unitizing element and the axis of rotation;
        a stator engaging member that engages the stator groove;
        a rotor engaging member that engages the rotor groove; and
        a rear member comprising a top edge, a bottom edge, and a side edge, wherein the side edge extends from the unitizing element to engage the stator; and
        two adjoining areas of differing diameter, one area corresponding to the rotor engagement member and the other corresponding to the rear member.

2. The assembly of claim 1 wherein the unitizing element plane that the first and second unitizing element portions are aligned along is substantially the same plane as the rotor plane that the first and second rotor portions are aligned along.

3. The assembly of claim 2 wherein the first unitizing element portion is adhered to the first rotor portion and wherein the second unitizing element portion is adhered to the second rotor portion.

4. The assembly of claim 3 wherein the stator plane the first and second stator portions are aligned along is substantially perpendicular to the rotor plane the first and second rotor portions are aligned along.

5. The assembly of claim 1 wherein the first and second rotor portions are substantially identical.

6. The assembly of claim 1 wherein the first and second stator portions are substantially identical.

7. The assembly of claim 3 wherein the rotor portions are fastened together.

8. The assembly of claim 7 wherein the fastener is one of a group consisting of screws, snap rings, and pins.

9. The assembly of claim 1 wherein the stator further comprises a stator O-ring comprising a first stator O-ring portion and a second stator O-ring portion, wherein the first stator O-ring portion is adhered to said first stator portion and the second stator O-ring portion is adhered to the second stator portion.

10. The assembly of claim 1 wherein the rotor further comprises a rotor O-ring comprising a first rotor O-ring portion and a second rotor O-ring portion, wherein the first rotor O-ring portion is adhered to said first rotor portion and the second rotor O-ring portion is adhered to the second stator portion.

11. An assembly for sealing a housing and a shaft rotatable relative to and extending through the housing, the assembly comprising:
    a stator comprising:
        at least two stator portions; and
        a stator annular engagement flange extending in an axial direction comprising a stator groove on a radial side thereof;
    a rotor comprising:
        at least two rotor portions; and
        a rotor annular engagement flange extending in an axial direction comprising a rotor groove on a radial side thereof; and
    an annular unitizing element comprising:
        at least two unitizing element portions;
        a stator engaging member that engages the stator groove;
        a rotor engaging member that engages the rotor groove; and
        a rear member comprising a top edge, a bottom edge, and a side edge, wherein the side edge extends from the unitizing element to engage the stator; and
        two adjoining areas of differing diameter, one area corresponding to the rotor engagement member and the other corresponding to the rear member.

12. The assembly of claim 11 wherein the at least two stator portions are substantially identical.

13. The assembly of claim 11 wherein the at least two rotor portions are substantially identical.

14. The assembly of claim 11 wherein the rotor portions are fastened together.

15. The assembly of claim 14 wherein the fastener is one of a group consisting of screws, snap rings, and pins.

16. The assembly of claim 11 wherein the stator further comprises a stator O-ring comprising a first stator O-ring portion and a second stator O-ring portion, wherein the first stator O-ring portion is adhered to said first stator portion and the second stator O-ring portion is adhered to the second stator portion.

17. The assembly of claim 11 wherein the rotor further comprises a rotor O-ring comprising a first rotor O-ring portion and a second rotor O-ring portion, wherein the first rotor O-ring portion is adhered to said first rotor portion and the second rotor O-ring portion is adhered to the second stator portion.

18. A method of forming a seal for a bearing housing and a rotating shaft comprising an axis of rotation, the method comprising the steps of:
    aligning a first semi-annular stator portion with a second semi-annular stator portion along a stator plane extending through a diameter of the stator and the axis of rotation to form a stator;
    engaging a first rotor engaging member of a first semi-annular unitizing element portion to a first semi-annular rotor portion along a rotor groove on a radial side of a first rotor engagement flange of the first semi-annular rotor portion;
    engaging a second rotor engaging member of a second semi-annular unitizing element portion to a second semi-annular rotor portion along a rotor groove on a radial side of a second rotor engagement flange of the second semi-annular rotor portion;
    engaging a first stator engaging member of a first semi-annular unitizing element portion to a first semi-annular stator portion along a stator groove on a radial side of a first stator engagement flange of the first semi-annular stator portion;
    engaging a second stator engaging member of a second semi-annular unitizing element portion to a second semi-annular stator portion along a stator groove on a radial side of a second stator engagement flange of the second semi-annular stator portion;
    aligning a first side edge of a first rear member of the first semi-annular unitizing element portion with the stator groove; and
    aligning a second side edge of a second rear member of the second semi-annular unitizing element portion with the stator groove.

19. The method of claim 18 further comprising the step of fastening the first semi-annular rotor portion and second semi-annular rotor portion together.

* * * * *